(12) United States Patent
Takato

(10) Patent No.: US 8,456,767 B2
(45) Date of Patent: Jun. 4, 2013

(54) OBJECTIVE OPTICAL SYSTEM

(75) Inventor: Hideyasu Takato, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/199,257

(22) Filed: Aug. 23, 2011

(65) Prior Publication Data

US 2012/0057251 A1 Mar. 8, 2012

Related U.S. Application Data

(63) Continuation of application No. PCT/JP2010/071213, filed on Nov. 29, 2010.

(30) Foreign Application Priority Data

Dec. 11, 2009 (JP) .................................. 2009-282205

(51) Int. Cl.
*G02B 9/12* (2006.01)
(52) U.S. Cl.
USPC .......................................... 359/784; 359/753
(58) Field of Classification Search
USPC .................................................. 359/745–792
See application file for complete search history.

(56) References Cited

U.S. PATENT DOCUMENTS

| | | | |
|---|---|---|---|
| 4,059,344 A | 11/1977 | Yamasita | |
| 2008/0180809 A1 | 7/2008 | Igarashi | |
| 2010/0142058 A1* | 6/2010 | Takato | 359/661 |

FOREIGN PATENT DOCUMENTS

| | | |
|---|---|---|
| JP | 45-007594 | 3/1970 |
| JP | 45-7594 | 3/1970 |
| JP | 51-049734 | 4/1976 |
| JP | 55-015005 | 4/1980 |
| JP | 61-044283 | 10/1986 |
| JP | 01-200316 | 8/1989 |
| JP | 06-317744 | 11/1994 |
| JP | 08-248312 | 9/1996 |
| JP | 9-90213 | 4/1997 |
| JP | 09-090213 | 4/1997 |
| JP | 11-316339 | 11/1999 |
| JP | 2000-162541 | 6/2000 |
| JP | 2000-267002 | 9/2000 |
| JP | 2000-330015 | 11/2000 |
| JP | 2002-028126 | 1/2002 |
| JP | 2005-191326 | 7/2005 |
| JP | 2008-107391 | 5/2008 |

(Continued)

OTHER PUBLICATIONS

International Search Report, issued in corresponding International Application No. PCT/JP2010/071213.

*Primary Examiner* — Darryl J Collins
(74) *Attorney, Agent, or Firm* — Kenyon & Kenyon LLP

(57) ABSTRACT

Provided is a high-performance objective optical system which is compatible with a high-pixel-count image acquisition device, in which focusing can be achieved according to a change in object point distance and which has sufficient depth of field at the individual object point distances. Provided is an objective optical system (1) including, in order from an object side, a first group (G1), a second group (G2), and a third group (G3), in which the first group (G1) includes, in order from the object side, a plano-concave lens (L1) and a meniscus lens (L2) whose convex surface is towards an image side and in which the second group (G2) includes a positive meniscus lens whose convex surface is towards the object side and moves in the direction of an optical axis to perform focusing.

6 Claims, 14 Drawing Sheets

FOREIGN PATENT DOCUMENTS

| | | |
|---|---|---|
| JP | 2009-047722 | 3/2009 |
| JP | 2009-16325 | 7/2009 |
| JP | 2009-151191 | 7/2009 |
| JP | 2009-163256 | 7/2009 |

\* cited by examiner

OBJECTIVE OPTICAL SYSTEM

CROSS REFERENCE TO RELATED APPLICATIONS

This is a continuation of International Application PCT/JP2010/071213, with an international filing date of Nov. 29, 2011, which is hereby incorporated by reference herein in its entirety. This application claims the benefit of Japanese Patent Application No. 2009-282205, the content of which is incorporated herein by reference.

TECHNICAL FIELD

The present invention relates to an objective optical system having a focusing function, and in particular, to an endoscope objective lens capable of near observation and an image-capturing lens for consumer compact cameras and so on.

BACKGROUND ART

In the related art, general objective lenses for endoscopes have no focusing function but have large observation depths ranging from about 5 to 100 mm from the object side. Endoscopes equipped with such an objective lens provide images using a solid-state image acquisition device, such as a CCD. Recently, to improve diagnostic accuracy, it has been necessary to improve the quality of endoscopic images, and thus, the pixel count of CCDs is increasing. Using high-pixel-count CCDs results in the need to decrease the Fno. of the objective lens to prevent degradation of image quality due to diffraction and to increase the focal length of the objective lens due to an increase in the size of the CCD with an increase in the number of pixels, and thus, the observation depth is being decreased.

This therefore has increased the need for an optical system in which the observation depth can be increased as much as possible and an objective lens having a focusing function to ensure the same level of observation depth as that of a conventional one. A known objective optical system that aims at increasing the depth reduces the focal length while maintaining the same angle of view by using a first lens having a meniscus shape to prevent the occurrence of distortion (for example, see Patent Literature 1). Known objective lenses having a focusing function are constituted by two groups, that is, negative and positive groups, two positive groups, or three groups, that is, negative, positive, and positive groups, respectively, and achieve focusing by moving the second group (for example, see Patent Literatures 2 to 4).

In addition, other known types of magnifying endoscope objective lenses capable of focusing on a nearer object point are constituted by three groups, that is, positive, negative, and positive groups, in which the negative second group moves to achieve focusing (for example, see Patent Literatures 4 to 6). Another known type of objective lens is constituted by three groups, that is, negative, positive, and negative groups, in which the positive second group moves to achieve focusing (for example, see Patent Literature 7).

CITATION LIST

{Patent Literature}
{PTL 1} Japanese Unexamined Patent Application, Publication No. 2009-151191
{PTL 2} Japanese Examined Patent Application, Publication No. Sho 55-15005
{PTL 3} Japanese Unexamined Patent Application, Publication No. 2000-330015
{PTL 4} Japanese Unexamined Patent Application, Publication No. 2002-28126
{PTL 5} Japanese Examined Patent Application, Publication No. Sho 61-44283
{PTL 6} Japanese Unexamined Patent Application, Publication No. Hei 6-317744
{PTL 7} Japanese Unexamined Patent Application, Publication No. Hei 11-316339
{PTL 8} Japanese Unexamined Patent Application, Publication No. 2000-267002

SUMMARY OF INVENTION

Technical Problem

Of the foregoing related art, the objective lens disclosed in Patent Literature 1 is configured such that the first concave lens has a meniscus shape, and thus, the lens protrudes at the distal end of the endoscope. Therefore, water break is insufficient during observation and scratches tend to occur more frequently at the distal end lens due to impacts or the like. The endoscope objective lenses disclosed in Patent Literatures 2 and 3 have the narrow field of view during observation. The objective lens disclosed in Patent Literature 4 has considerable fluctuations on the image plane during focusing.

Since the optical systems disclosed in Patent Literatures 5 to 8 have a wide object point range in which focusing is possible, thus allowing observation at a nearer location, the magnification during the nearest observation is large, which is therefore suitable for magnified observation. There is a large change in the angle of view during focusing; that is, it is wide during ordinary observation of a far object point but becomes extremely narrow during near observation.

Furthermore, Patent Literatures 2, 4, and 6 disclose objective optical systems in which the first lens is formed in a meniscus shape to increase the depth.

An object of the present invention is to provide, in an objective optical system in which focusing can be achieved according to a change in object point distance, a high-performance objective optical system in which distortion hardly occurs and which is compatible with a high-pixel-count image acquisition device.

Solution to Problem

A first aspect of the present invention is an objective optical system comprising, in order from an object side, a first group, a second group, and a third group, wherein the first group includes, in order from the object side, a plano-concave lens and a meniscus lens whose convex surface is towards an image side; and the second group includes a positive meniscus lens whose convex surface is towards the object side and moves in a direction of an optical axis to perform focusing.

To perform focusing to track fluctuations in the object point, from ordinary endoscopic observation of a far object point to near observation of a near object point, it is necessary to adjust the focus by moving at least one group. A moving lens group for focusing may be any of the plurality of constituent groups.

Preferably, the first group is constituted by a plano-concave lens disposed on the object side and a meniscus lens whose convex surface is towards the image side. To increase the depth while keeping the angle of view constant, the focal length must be decreased. This absolutely needs correction of distortion.

This therefore requires that another lens have a distortion correcting action. The lens for distortion correction is preferably disposed in the vicinity of the first lens.

In the first aspect described above, preferably, the first group has negative power; and the third group has positive power.

In the first aspect described above, preferably, the third group includes a first positive lens and a joined lens composed of a second positive lens and a negative lens.

Preferably, the second group, which is a moving group, is a positive group. Furthermore, preferably, the moving lens is a positive meniscus lens whose convex surface is towards the object side.

Preferably, the third group is constituted by a first positive lens and a joined lens composed of a second positive lens and a negative lens.

In the first aspect described above, preferably, the following Conditional Expressions (1) and (2) are satisfied:

$$|f/f2| < 0.12 \quad (1)$$

$$0.92 < f/IH < 1.08 \quad (2)$$

where f is a focal length of an entire system during far-point observation, f2 is a focal length of the meniscus lens, and IH is an image height.

Preferably, the meniscus lens serving as the second lens is a positive lens or a negative lens not having high power and correcting high-degree distortion.

Conditional Expression (2) is a conditional expression for limiting the ratio of a focal length to an image height.

A second aspect of the present invention is an objective optical system comprising, in order from an object side, a plano-concave lens, a meniscus lens whose convex surface is towards an image side, a positive meniscus lens whose convex surface is towards the object side, an aperture stop, a first positive lens having convex surfaces at both sides, and a joined lens composed of a second positive lens and a negative lens, and satisfying the following Conditional Expression (3):

$$0.08 < d/f < 0.32 \quad (3)$$

where d is an air gap between the meniscus lens and the first positive lens.

Conditional Expression (3) is a conditional expression for decreasing the field curvature. If the value falls below the lower limit of Conditional Expression (3), the meridional image plane is inclined over, and if the value exceeds the upper limit of Conditional Expression (3), the meridional image plane is inclined under, respectively.

DESCRIPTION OF EMBODIMENTS

An embodiment of the present invention will be described hereinbelow with reference to FIG. 1 and FIG. 2.

Figure 1:
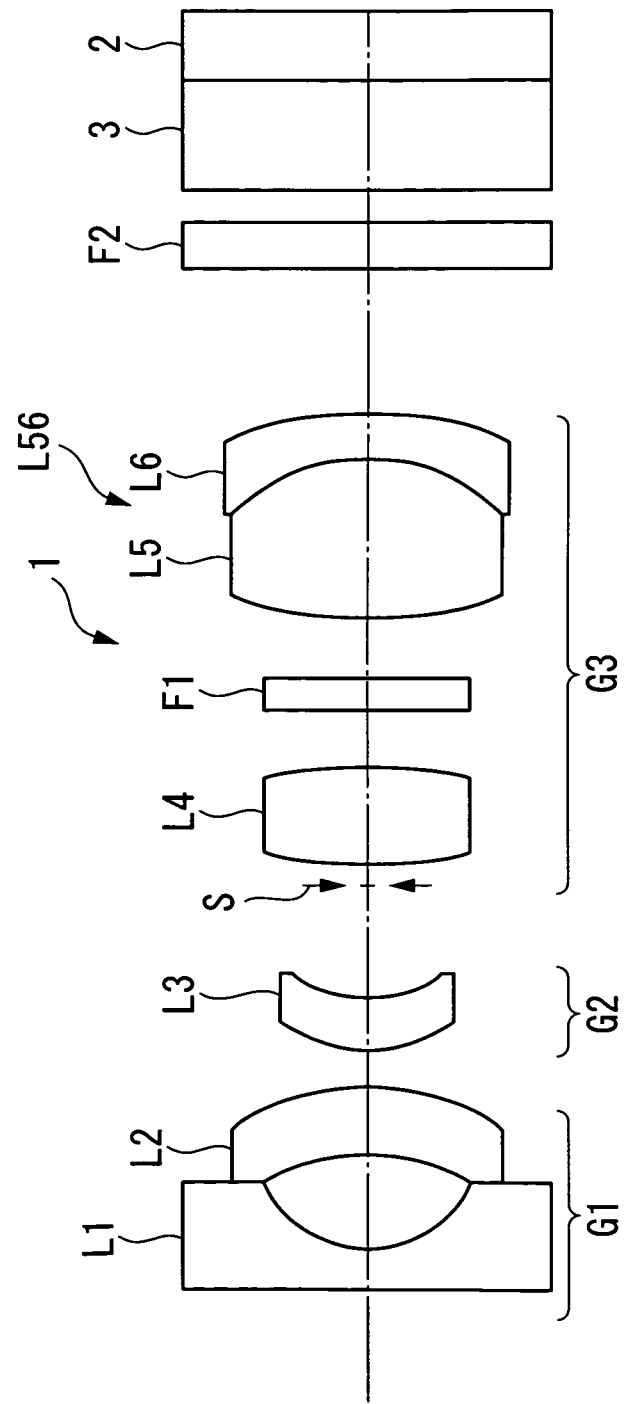
FIG. 1 is a diagram showing the overall configuration of an objective optical system according to an embodiment of the present invention, showing an ordinary observation state.
Figure 2:
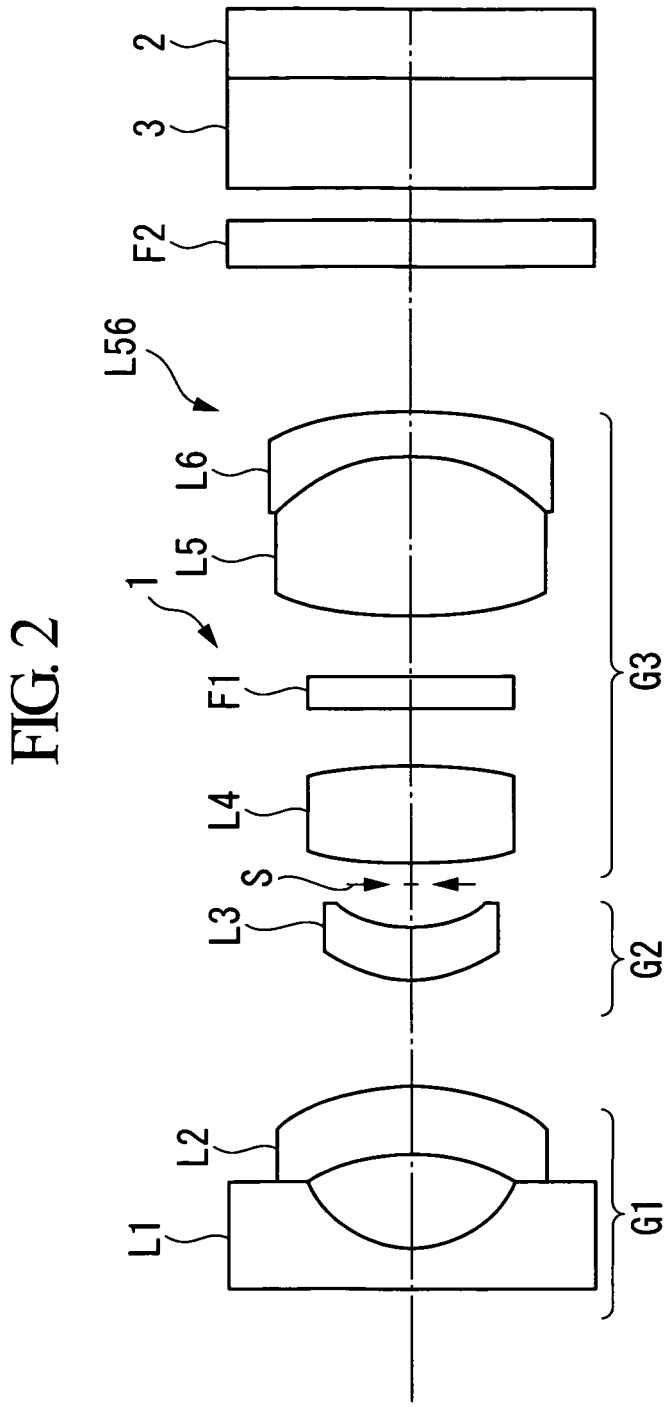
FIG. 2 shows a near observation state of the objective optical system in FIG. 1.

As shown in FIGS. 1 and 2, an objective optical system 1 according to this embodiment is constituted by, in order from the object side, a first group G1 having negative refractive power, a second group G2 having positive refractive power, and a third group G3 having positive refractive power.

The first group G1 is constituted by, in order from the object side, a first lens L1, which is a negative lens, and a second lens L2, which is a positive lens or a negative lens having low power. The second group G2 is constituted by a third lens L3, which is a positive lens. The second group G2 has a focusing action in an ordinary observation state (see FIG. 1) and in a near observation state (see FIG. 2) by means of the third lens L3 moving on the optical axis. The third group G3 is constituted by, in order from the object side, a fourth lens (first positive lens) L4, which is a positive lens, and a positive joined lens L56 in which a positive lens (second positive lens) L5 and a negative lens L6 are joined.

An aperture stop S is disposed between the second group G2 and the third group G3. The aperture stop S is fixed in front of the third group G3 during focusing. Reference signs F1 and F2 denote parallel flat plates. The parallel flat plates F1 and F2 are filters or the like for cutting off light with a specific wavelength, for example, 1060 nm light from a YAG laser, 810 nm light from a semiconductor laser, and light in the near-infrared region. The parallel flat plates F1 and F2 are suitably disposed on the optical axis; in the illustrated example, they are disposed between the fourth lens L4 and the joined lens L56 and after the third group G3.

The objective optical system 1 according to this embodiment constitutes an image-capturing optical system together with an image acquisition device (not shown), such as a CCD, disposed in the vicinity of an image plane. Reference sign 2 denotes chip-sealing glass that seals the surface of the image acquisition device. Reference sign 3 denotes an optical element, such as a cover glass.

The objective optical system 1 satisfies the following Conditional Expressions (1) and (2):

$$|f/f2|<0.12 \quad (1)$$

$$0.92<f/\text{IH}<1.08 \quad (2)$$

where f is the focal length of the entire system during far-point observation, f2 is the focal length of the second lens L2, and IH is the image height.

Preferably, the meniscus lens serving as the second lens L2 is a positive lens or a negative lens not having high power and correcting high-degree distortion. Exceeding the range of Conditional Expression (1) causes a large field curvature and also reduces the distortion correction effect, which is not desirable.

Conditional Expression (2) is a conditional expression for limiting the ratio of a focal length to an image height.

If a comparison is made at a fixed angle of view, the focal length relative to the image height is small provided that the value is within the range of Conditional Expression (2), which therefore increases the effect of increasing the depth. If the value falls below the lower limit of Conditional Expression (2), the focal length becomes too small, and thus, the magnification at the center of the screen is decreased, which makes it difficult to observe a lesion. If the value exceeds the upper limit of Conditional Expression (2), the focal length increases, which decreases the effect of increasing the depth, which is not desirable.

The objective optical system 1 also satisfies the following Conditional Expression (3):

$$0.08<d/f<0.32 \quad (3)$$

where d is the air gap between the second lens L2 and the third lens L3.

Conditional Expression (3) is a conditional expression for decreasing the field curvature. If the value falls below the lower limit of Conditional Expression (3), the meridional image plane is inclined over, and if the value exceeds the upper limit of Conditional Expression (3), the meridional image plane is inclined under, respectively. Accordingly, this causes degradation of a peripheral image in terms of performance, which is not desirable.

More preferably, the objective optical system 1 satisfies the following Conditional Expression (3)':

$$0.12<d/f<0.24 \quad (3)'$$

With the thus-configured objective optical system 1, a sufficiently wide depth of field can be obtained by changing the object point distance by moving the second group G2. Furthermore, by setting the focal lengths of the groups G1 to G3 to appropriate values, the configuration can be made compact while preventing degradation of image quality due to distortion. Furthermore, by constituting the image-capturing optical system in combination with a high-pixel-count image acquisition device, high-definition images can be obtained at individual object points.

That is, to perform focusing to track fluctuations in the object point, from ordinary endoscopic observation of a far object point to near observation of a near object point, it is necessary to adjust the focus by moving at least one group. A moving lens group for focusing may be any of the plurality of constituent groups. Here, using the second group G2 disposed near an aperture stop as the moving lens group can reduce the lens diameter, thereby decreasing the load on a driving mechanism. The moving lens group may be one or a plurality of groups; however, using only one group has the merit of simplifying the mechanical structure.

There is also a method of moving the entire system or the image acquisition device itself; however, this increases the weight of the lens group to be moved or the image acquisition device and also requires increasing the size of the mechanism itself, which is not desirable. The thus-configured objective optical system 1 can achieve a focusing mechanism provided that the group configuration includes two or more groups. If the objective optical system 1 is constituted by only two groups, fluctuation of the image plane during focusing tends to increase. In this case, there is no problem if the object point range in which focusing is possible is narrow. However, the group configuration needs to have three or more groups in consideration of focusing in a somewhat wide object point range. The three-group configuration can achieve a high-performance objective optical system 1 that is sufficiently compatible with a high-pixel-count image acquisition device.

Preferably, the first group G1 is constituted by a plano-concave lens disposed on the object side and a meniscus lens whose convex surface is towards the image side. To increase the depth while keeping the angle of view constant, the focal length must be decreased. This absolutely needs correction of distortion. Preferably, the first lens L1 is a plano-concave lens whose lens surface does not protrude to facilitate water breaking during observation and to resist scratches or the like on the outer surface. However, this makes it impossible to form the first lens L1 in the shape of a concave meniscus lens to correct distortion.

Therefore, this requires that another lens have a distortion correcting action. The lens for distortion correction is preferably disposed in the vicinity of the first lens L1. The use of a meniscus lens with an optimum shape, that is, a lens whose convex surface is towards the image side, as the second lens L2, as in the embodiment described above, can offer a distortion correction effect.

In the embodiment described above, preferably, the first group G1 has negative power; and the third group G3 has positive power. To reduce image plane fluctuations during focusing, it is optimal that the first group G1 is a negative group, and the third group G3 is a positive group.

In the embodiment described above, preferably, the second group G2 includes a positive meniscus lens whose convex surface is towards the object side; the third group G3 includes a first positive lens L4 and a joined lens L56 composed of a second positive lens L5 and a negative lens L6.

To eliminate a change in the angle of view during focusing, preferably, the second group G2, which is a moving group, is a positive group. If the moving group is a negative group, the change in the position of an entrance pupil is large, causing a corresponding large change in the angle of view, which is undesirable. Furthermore, preferably, the moving lens is a positive meniscus lens whose convex surface is towards the object side. This shape can reduce image plane fluctuations during focusing.

Preferably, the third group G3 is constituted by a first positive lens L4 and a joined lens L56 composed of a second positive lens L5 and a negative lends L6. The first positive lens L4 mainly contributes to image formation. The first positive lends L4 mainly contributes to image formation. The joined lens L56 composed of the second positive lens L5 and the negative lens L6 takes on a chromatic aberration correcting action.

Preferably, the above embodiment satisfies the following Conditional Expression (4):

$$-0.94<f1/f<-0.72 \quad (4)$$

where f1 is the focal length of the first lens 2.

Conditional Expression (4) is for the angle of view. If the value falls below the lower limit of Conditional Expression (4), the observation field of view decreases, causing frequent overlooking of lesions, which is undesirable. On the other hand, if the value exceeds the upper limit of Conditional Expression (4), the field of view can be ensured, but the error sensitivity of the image-side surface of the first lens L1 with respect to the angle of view becomes high, and thus, vignetting tends to occur due to manufacturing errors, which is undesirable.

Preferably, the above embodiment satisfies the following Conditional Expression (5):

$$5.1<f3/f<8.4 \quad (5)$$

where f3 is the focal length of the third lens L3.

Conditional Expression (5) is for the amount of movement of the third lens L3, which serves as a moving lens. If the value falls below the lower limit of Conditional Expression (5), the power of the third lens L3 increases, and thus, using a positive meniscus lens whose convex surface is towards the object side also increases field curvature changes during focusing. On the other hand, if the value exceeds the upper limit of Conditional Expression (5), the power of the third lens L3 decreases, and thus, the amount of lens movement increases, which increases the size of the mechanical driving system, which is undesirable.

Preferably, the above embodiment satisfies the following Conditional Expression (6):

$$1.2<f4/f<2.6 \quad (6)$$

where f4 is the focal length of the fourth lens L4.

The fourth lens L4 plays the role of forming an image on an imaging plane. If the value falls below the lower limit of Conditional Expression (6), sufficient back focusing cannot be ensured. This makes it impossible to ensure a sufficient amount of adjustment of the image capturing position, performed behind the last lens L6, due to manufacturing errors of the objective optical system 1, which is undesirable. On the other hand, if the value exceeds the upper limit of Conditional Expression (6), the spherical aberration during near observation becomes under-corrected, which makes it impossible to obtain sufficient resolution.

Preferably, the above embodiment satisfies the following Conditional Expression (7):

$$0.55<|f5/f6|<0.94 \quad (7)$$

where f5 is the focal length of the positive lens L5, and f6 is the focal length of the negative lens L6.

Conditional Expression (7) is mainly for correction of axial chromatic aberration. If the value falls below the lower limit of Conditional Expression (7), the C-line and the F-line increase, over and under, respectively, which is not desirable. On the other hand, if the value exceeds the upper limit of Conditional Expression (7), the C-line and the F-line increase, under and over, respectively, which is not desirable.

Preferably, the above embodiment satisfies the following Conditional Expression (8):

$$0.95<|r/f|<1.3 \quad (8)$$

where r is the radius of curvature of the joining surface of the positive lens L5 and the negative lens L6.

Conditional Expression (8) is mainly for magnification chromatic aberration. If the value falls below the lower limit of Conditional Expression (8), the C-line and the F-line increase, over and under, respectively, which is not desirable. On the other hand, if the value exceeds the upper limit of Conditional Expression (8), the C-line and the F-line increase, under and over, respectively, which causes a color blur, thus causing degradation of the peripheral resolution.

Preferably, the above embodiment satisfies the following Conditional Expression (9):

$$6<LTL/f<8 \quad (9)$$

where LTL is the total length of the lens system.

If the value falls below the lower limit of Conditional Expression (9), the lens total length becomes too short so that it becomes difficult to ensure a desired number of lenses. On the other hand, if the value exceeds the upper limit of Conditional Expression (9), the lens system; including the lens barrel part for holding the lenses, is increased in size, which makes it difficult to locate it at the distal end of the endoscope.

Preferably, the above embodiment satisfies the following Conditional Expression (10):

$$0.8<\omega n/\omega f<1.1 \quad (10)$$

where $\omega f$ is the maximum half angle of view during far observation, and $\omega n$ is the maximum half angle of view during near observation.

Conditional Expression (10) is for the observation angle of view during focusing. It is preferable that the angle of view changes as little as possible during focusing. If the change in angle of view increases, a change in field of view becomes noticeable during focusing. This results in a view like that in electronic magnification, which is not desirable. If the change in angle of view is within the range of Conditional Expression (10), the operator can perform focusing without a noticeable difference without recognition that the observation range has changed greatly.

If the value falls below the lower limit of Conditional Expression (10) during focusing while the position of the object is changed from a far object point to a near object point, a blurred image is focused on, and the object is viewed as if it is magnified, which is not desirable. On the other hand, if the value exceeds the upper limit of Conditional Expression (10), the object is viewed as if it is reduced, which is not desirable. Furthermore, this decreases the depth of focus during far observation, thus impairing the ease of use during observation for screening and so on.

Furthermore, more preferably, the above embodiment satisfies the following Conditional Expression (10)':

$$0.9<\omega n/\omega f<1.1 \quad (10)'$$

Since the change in angle of view is further reduced within the range of Conditional Expression (10)', the effects of Conditional Expression (10) can be further increased.

Preferably, the above embodiment satisfies the following Conditional Expression (11):

$$\omega f<60 \quad (11)$$

Conditional Expression (11) is an expression that limits the half angle of view, which is the field of view. To reduce the risk of overlooking a lesion in screening a living organism, it is preferable that it is as wide as possible; a viewing angle of 120° or more is needed at the minimum in the entire object point area. More preferably, the following Conditional Expression (11)' is satisfied, and the field of view is 140° or more:

$$\omega f<70 \quad (11)'$$

EXAMPLES

Next, Examples 1 to 3 of the foregoing embodiment will be described hereinbelow with reference to FIGS. 3 to 14.

In the reference drawings, r denotes the radius of curvature of a lens surface, d denotes the distance between lens surfaces, and numbers following r or d denote surface numbers. In the lens data described in this specification, the units of the radius of curvature and the distance between surfaces are mm. In the aberration diagrams, (a) shows spherical aberration, (b) shows astigmatism, (c) shows distortion, and (d) shows magnification chromatic aberration.

Example 1

Figure 3:
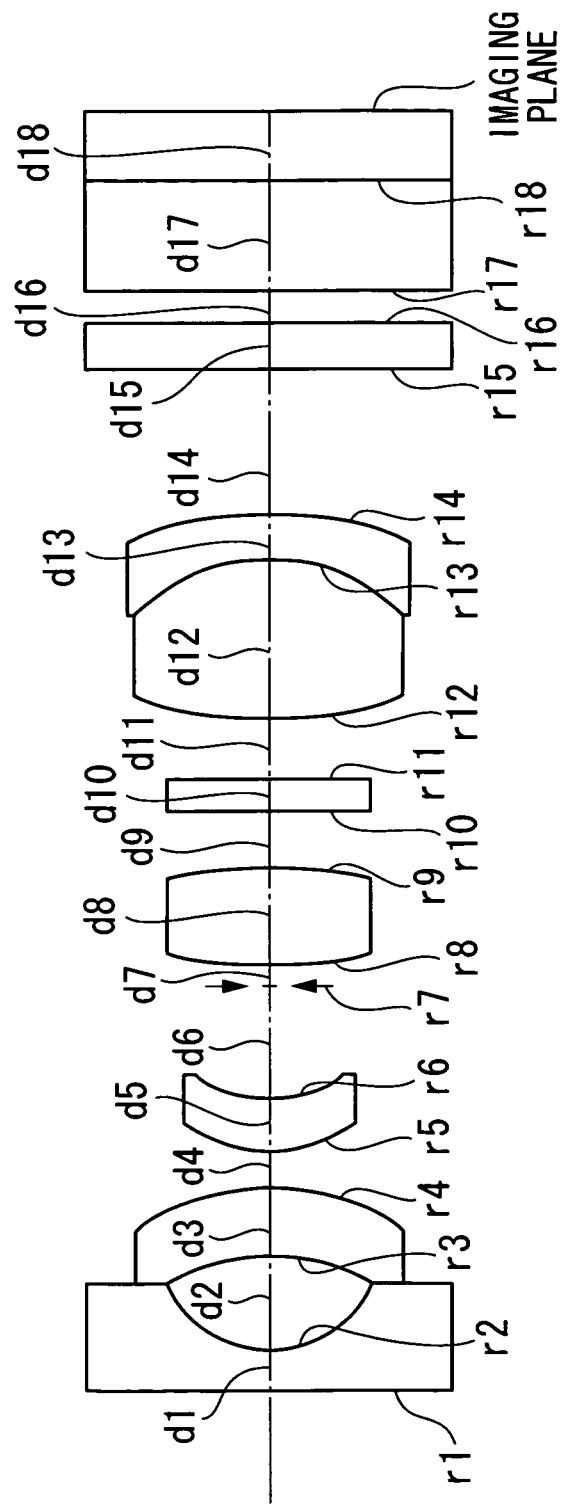
FIG. 3 is a lens cross-sectional view showing the configuration of an objective optical system according to Example 1 of the present invention, showing an ordinary observation state.
Figure 4:
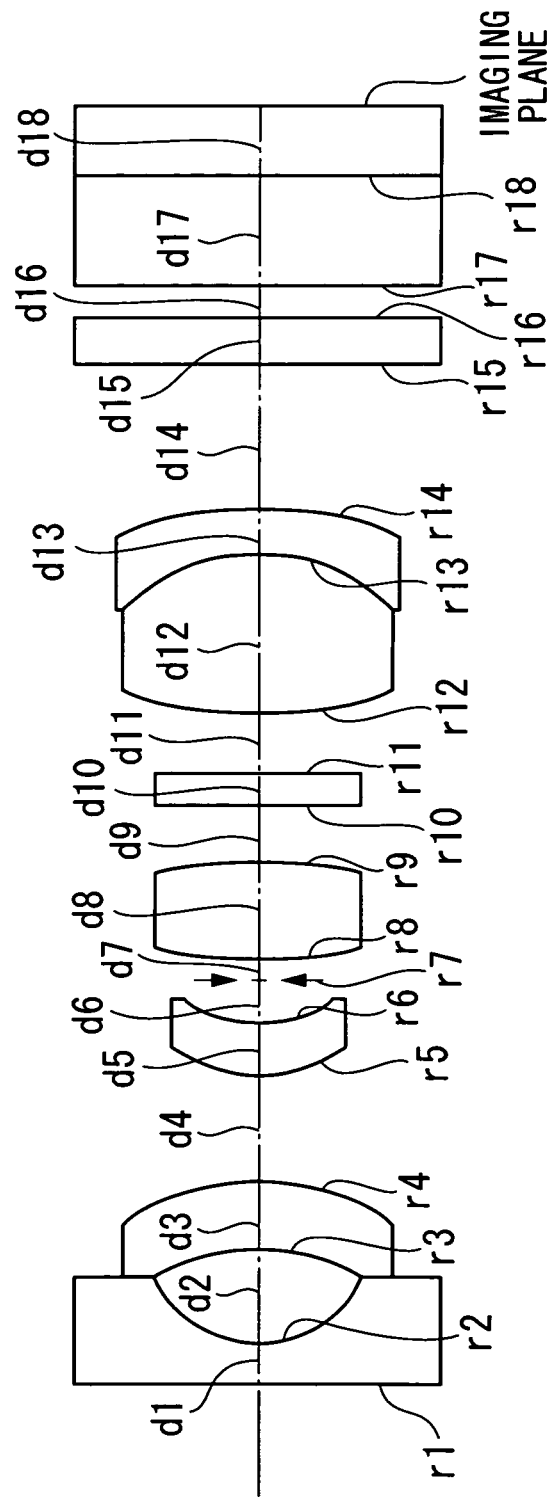
FIG. 4 shows the near observation state of the objective optical system in FIG. 3.

The configuration of an objective optical system according to Example 1 will be shown in FIGS. 3 and 4, and the lens data thereof will be shown below. FIG. 3 shows an ordinary observation state (far object point), and FIG. 4 shows a near observation state (near object point). The objective optical system according to this example is configured such that a first group is constituted by, in order from the object side, a negative lens and a positive lens having low power; a second group is constituted by a positive lens; and a third group is constituted by, in order from the object side, a positive lens, a parallel flat plate, and a positive joined lens in which a positive lens and a negative lens are joined. At the back of the third group, a parallel flat plate is disposed.

Figure 5:
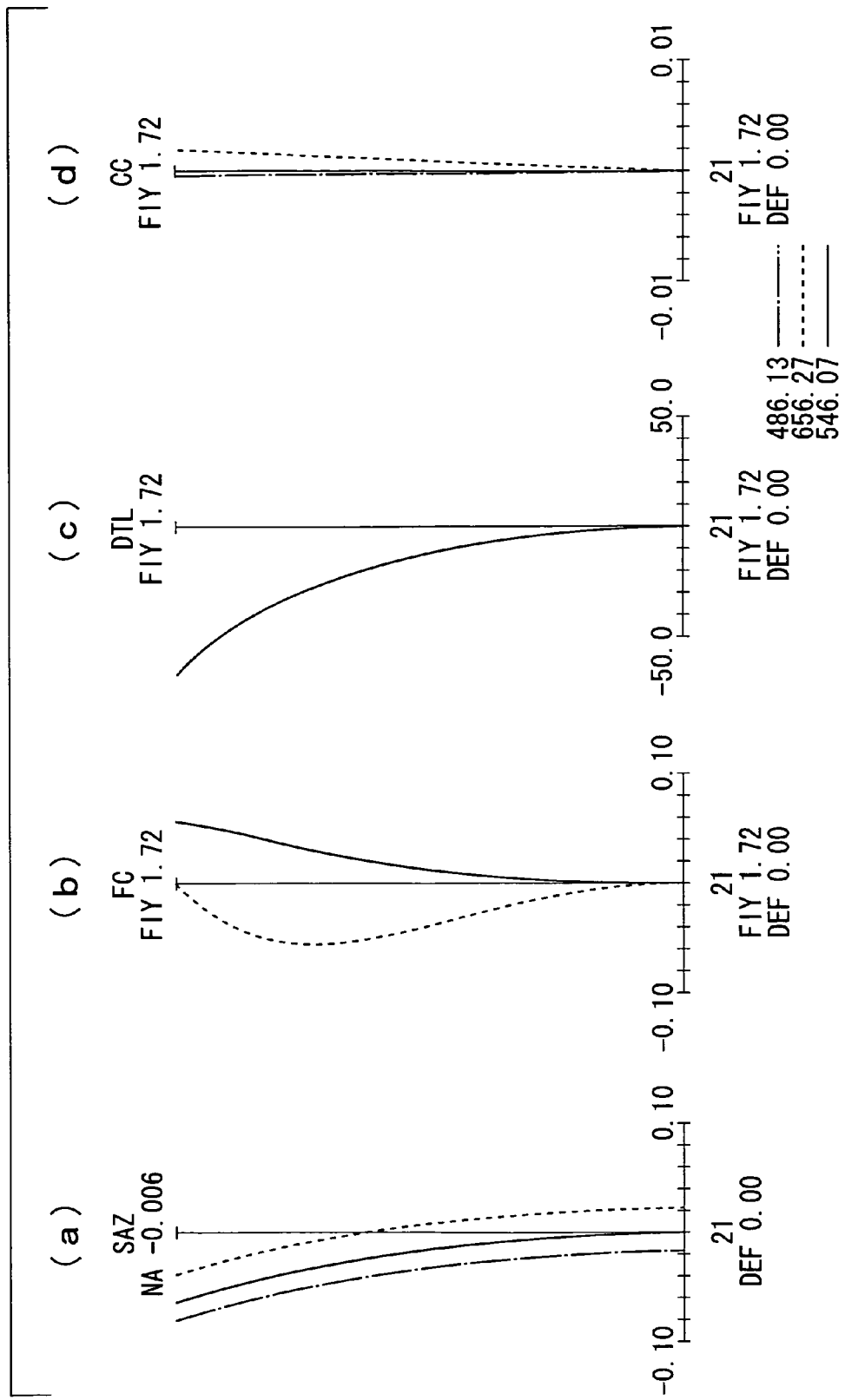
FIG. 5 shows aberration diagrams showing the spherical aberration, astigmatism, distortion, and magnification chromatic aberration of the objective optical system in FIG. 3.
Figure 6:
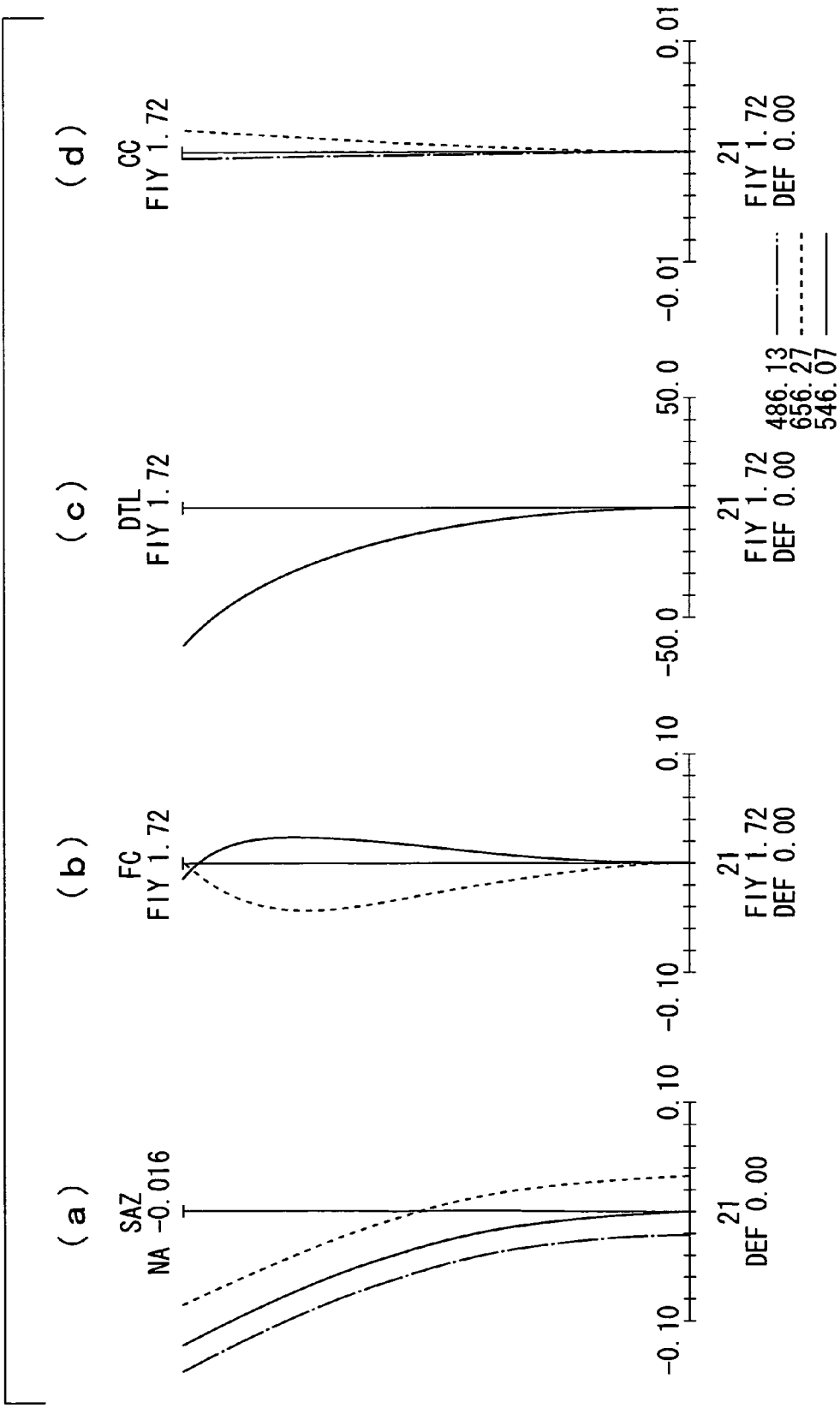
FIG. 6 shows aberration diagrams showing the spherical aberration, astigmatism, distortion, and magnification chromatic aberration of the objective optical system in FIG. 4.

The values of varying parameters of the thus-configured objective optical system in two states, that is, the ordinary observation state and the near observation state, are shown in Table 1, and aberration diagrams of the individual states are shown in FIGS. 5 and 6.

Lens Data

| Surface number | Radius of curvature | Distance between surfaces | Refractive index Ne | Abbe numbe νd |
|---|---|---|---|---|
| 1 | ∞ | 0.38 | 1.88815 | 40.76 |
| 2 | 1.182 | 0.85 | | |
| 3 | −2.465 | 0.66 | 1.88815 | 40.76 |
| 4 | −2.451 | D4 | | |
| 5 | 1.329 | 0.48 | 1.59143 | 61.14 |
| 6 | 1.442 | D6 | | |
| 7 | Aperture stop | 0.20 | | |
| 8 | 5.474 | 0.91 | 1.77621 | 49.60 |
| 9 | −5.474 | 0.53 | | |
| 10 | ∞ | 0.31 | 1.51564 | 75.00 |
| 11 | ∞ | 0.53 | | |
| 12 | 4.013 | 1.50 | 1.48915 | 70.23 |
| 13 | −1.951 | 0.39 | 1.93430 | 18.90 |
| 14 | −4.380 | 1.37 | | |
| 15 | ∞ | 0.40 | 1.52498 | 59.89 |
| 16 | ∞ | 0.30 | | |
| 17 | ∞ | 1.00 | 1.51825 | 64.14 |
| 18 | ∞ | 0.65 | 1.50801 | 60.00 |
| 19 | Imaging plane | | | |

TABLE 1

| Parameter | Ordinary Observation State | Near Observation State |
|---|---|---|
| Focal length | 1.72 | 1.64 |
| Fno | 8.11 | 8.12 |
| Object point distance | 18.5 | 5.6 |
| D4 | 0.34 | 0.98 |

TABLE 1-continued

| Parameter | Ordinary Observation State | Near Observation State |
|---|---|---|
| D6 | 1.04 | 0.4 |
| Image height IH | 1.72 mm | |

Example 2

Figure 7:
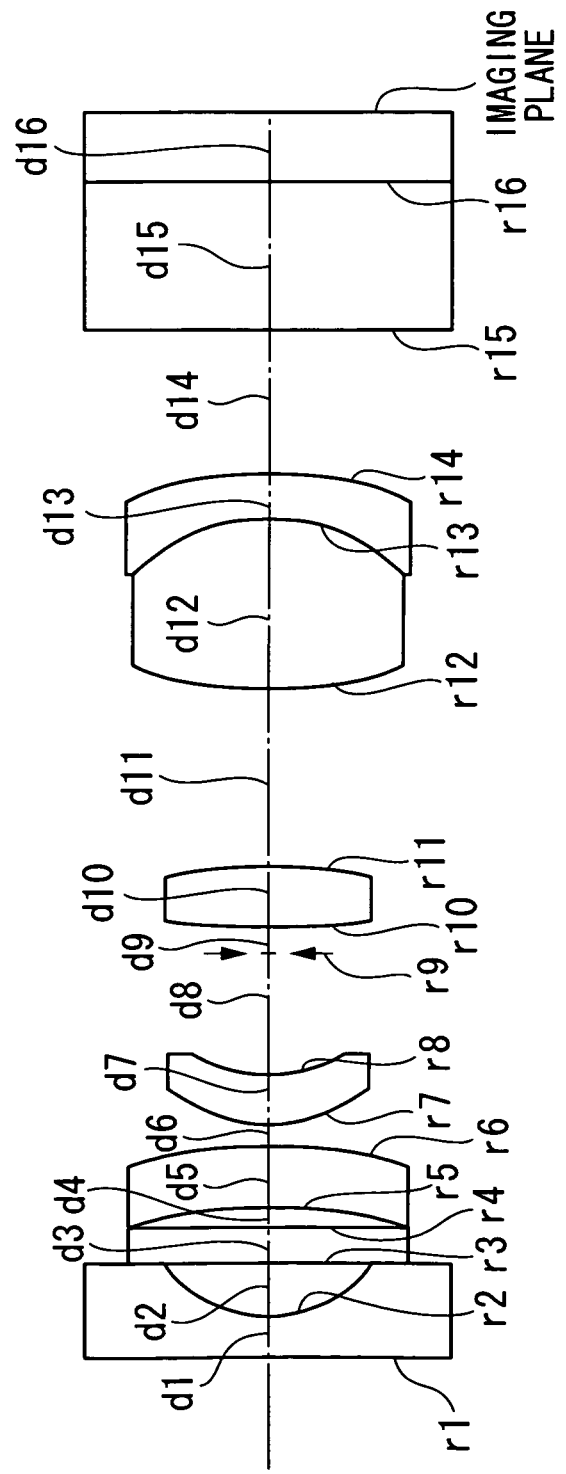
FIG. 7 is a lens cross-sectional view showing the configuration of an objective optical system according to Example 2 of the present invention, showing an ordinary observation state.
Figure 8:
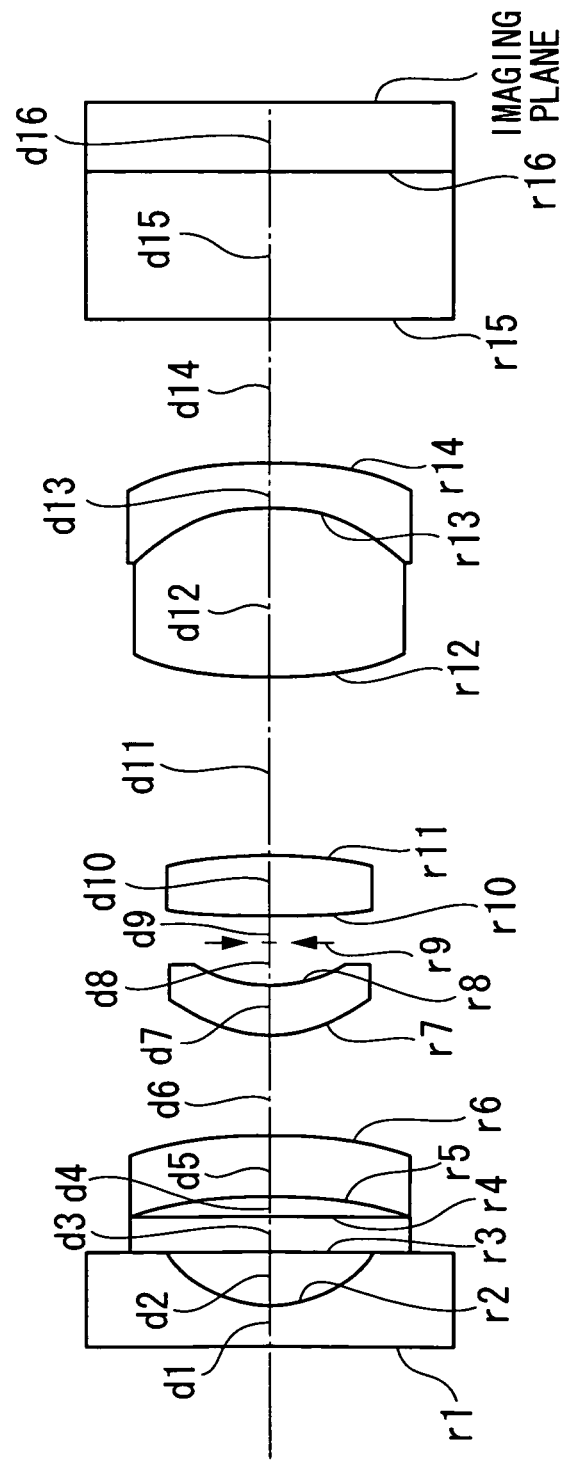
FIG. 8 shows the near observation state of the objective optical system in FIG. 7.

The configuration of an objective optical system according to Example 2 will be shown in FIGS. 7 and 8, and the lens data thereof will be shown below. FIG. 7 shows an ordinary observation state (far object point), and FIG. 8 shows a near observation state (near object point). The objective optical system of this embodiment is configured such that a first group is constituted by, in order from the object side, a negative lens, a parallel flat plate, and a negative lens having low power; a second group is constituted by a positive lens; and a third group is constituted by, in order from the object side, a positive lens and a positive joined lens in which a positive lens and a negative lens are joined.

Figure 9:
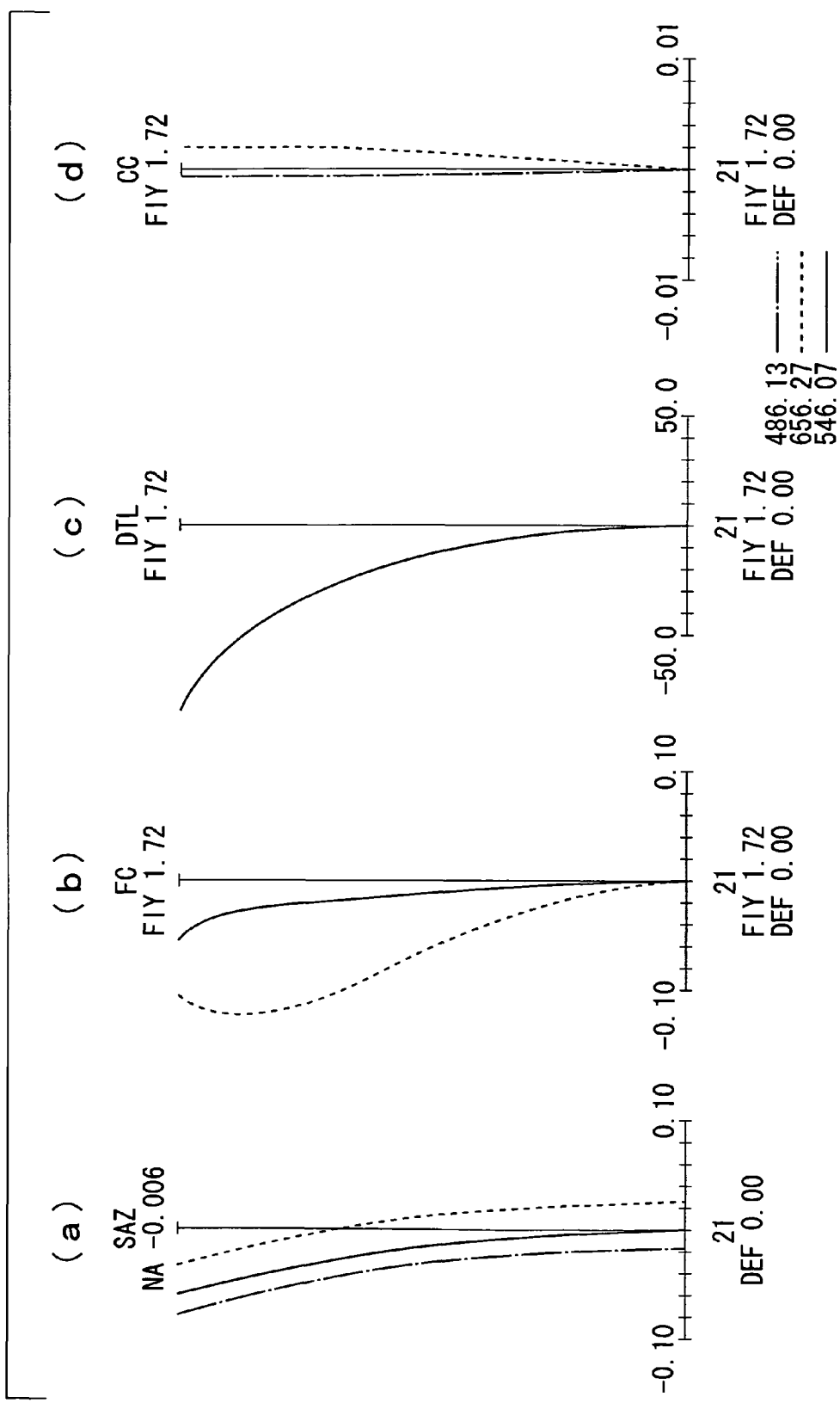
FIG. 9 shows aberration diagrams showing the spherical aberration, astigmatism, distortion, and magnification chromatic aberration of the objective optical system in FIG. 7.
Figure 10:
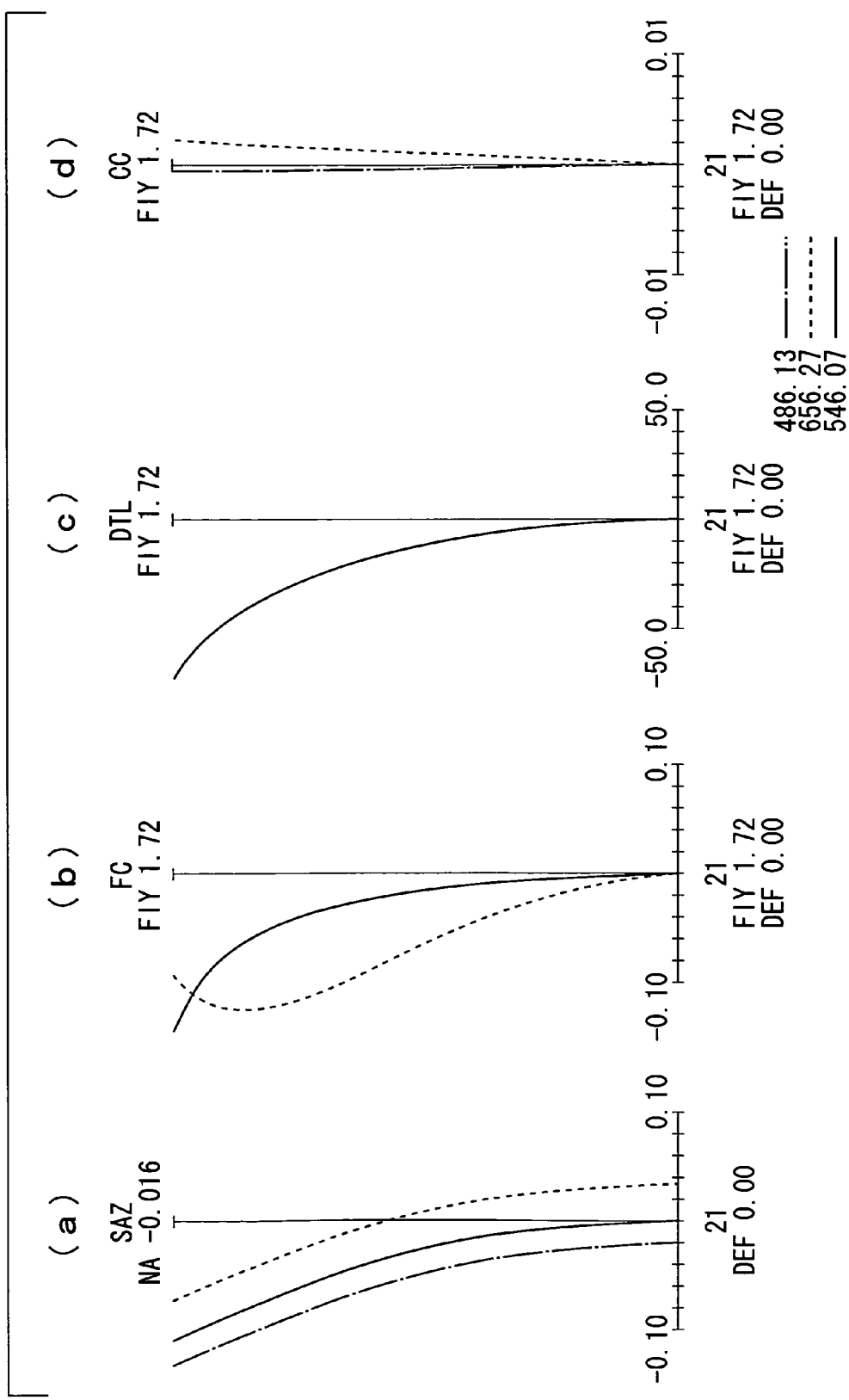
FIG. 10 shows aberration diagrams showing the spherical aberration, astigmatism, distortion, and magnification chromatic aberration of the objective optical system in FIG. 8.

The values of varying parameters of the thus-configured objective optical system in two states, that is, the ordinary observation state and the near observation state, are shown in Table 2, and aberration diagrams of the individual states are shown in FIGS. 9 and 10.

Lens Data

| Surface number | Radius of curvature | Distance between surfaces | Refractive index Ne | Abbe number νd |
|---|---|---|---|---|
| 1 | ∞ | 0.38 | 1.88815 | 40.76 |
| 2 | 1.305 | 0.53 | | |
| 3 | ∞ | 0.31 | 1.51564 | 75.00 |
| 4 | ∞ | 0.19 | | |
| 5 | −5.306 | 0.56 | 1.77621 | 49.60 |
| 6 | −5.895 | D6 | | |
| 7 | 1.560 | 0.48 | 1.59143 | 61.14 |
| 8 | 1.724 | D8 | | |
| 9 | Aperture stop | 0.20 | | |
| 10 | 3.903 | 0.60 | 1.77621 | 49.60 |
| 11 | −6.293 | 1.64 | | |
| 12 | 3.748 | 1.67 | 1.48915 | 70.23 |
| 13 | −1.860 | 0.39 | 1.93430 | |
| 14 | −4.120 | 1.37 | | |
| 15 | ∞ | 1.37 | 1.52498 | 59.89 |
| 16 | ∞ | 0.64 | 1.50801 | 60.00 |
| 17 | Imaging plane | | | |

TABLE 2

| Parameter | Ordinary Observation State | Near Observation State |
|---|---|---|
| Focal length | 1.67 | 1.61 |
| Fno | 7.68 | 7.69 |
| Object point distance | 18.5 | 5.6 |
| D6 | 0.24 | 0.99 |
| D8 | 1.16 | 0.41 |
| Image height IH | 1.72 mm | |

Example 3

Figure 11:
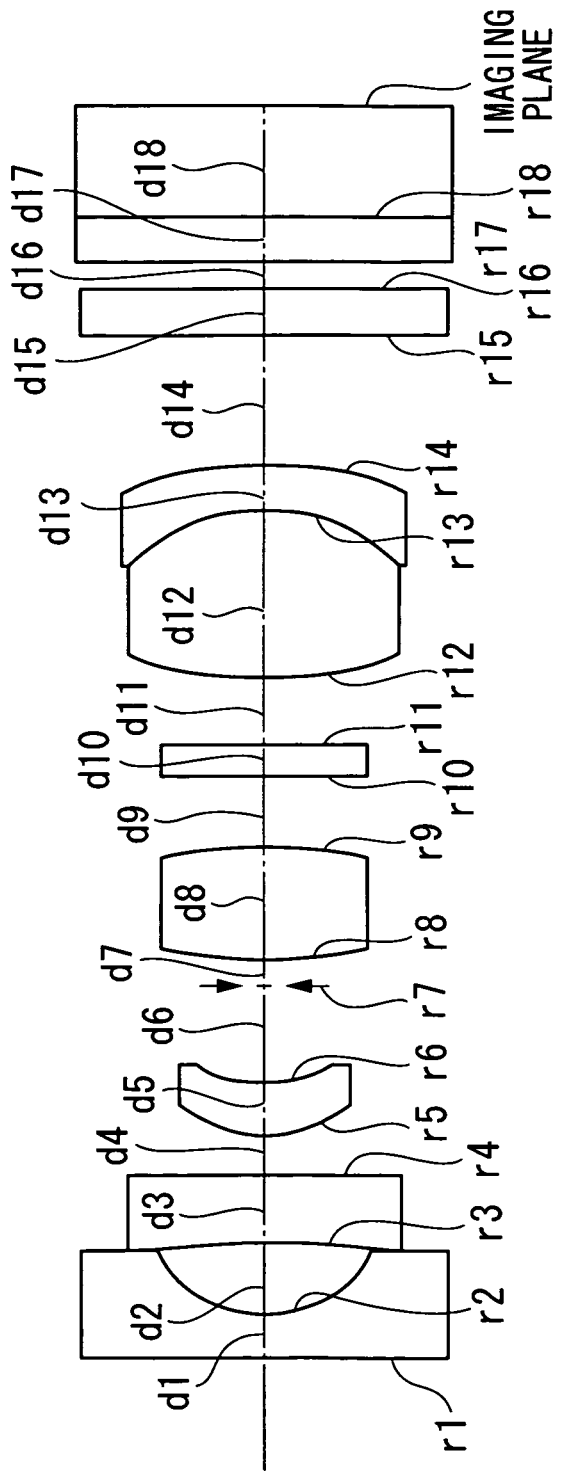
FIG. 11 is a lens cross-sectional view showing the configuration of an objective optical system according to Example 3 of the present invention, showing an ordinary observation state.
Figure 12:
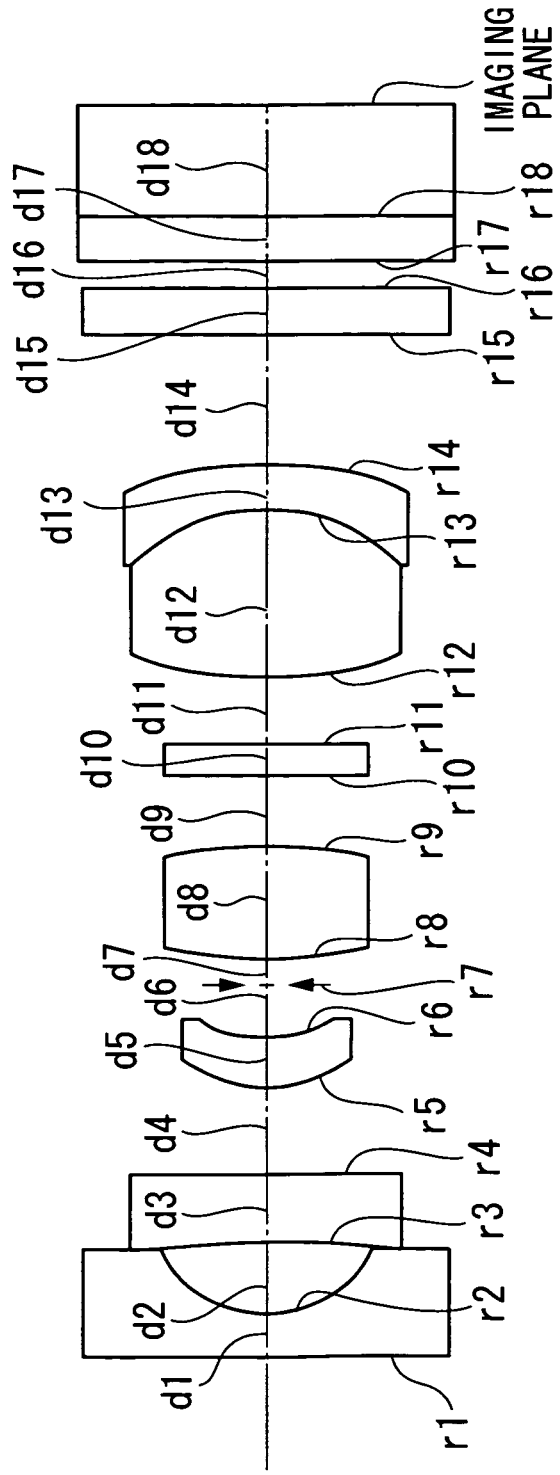
FIG. 12 is the near observation state of the objective optical system in FIG. 11.

The configuration of an objective optical system according to Example 3 will be shown in FIGS. 11 and 12, and the lens data thereof will be shown below. FIG. 11 shows an ordinary observation state (far object point), and FIG. 12 shows a near observation state (near object point). The objective optical system according to this example is configured such that a first group is constituted by, in order from the object side, a negative lens and a negative lens having low power; a second group is constituted by a positive lens; and a third group is constituted by, in order from the object side, a positive lens, a parallel flat plate, and a positive joined lens in which the positive lens and the negative lens are joined. At the back of the third group, a parallel flat plate is disposed.

Figure 13:
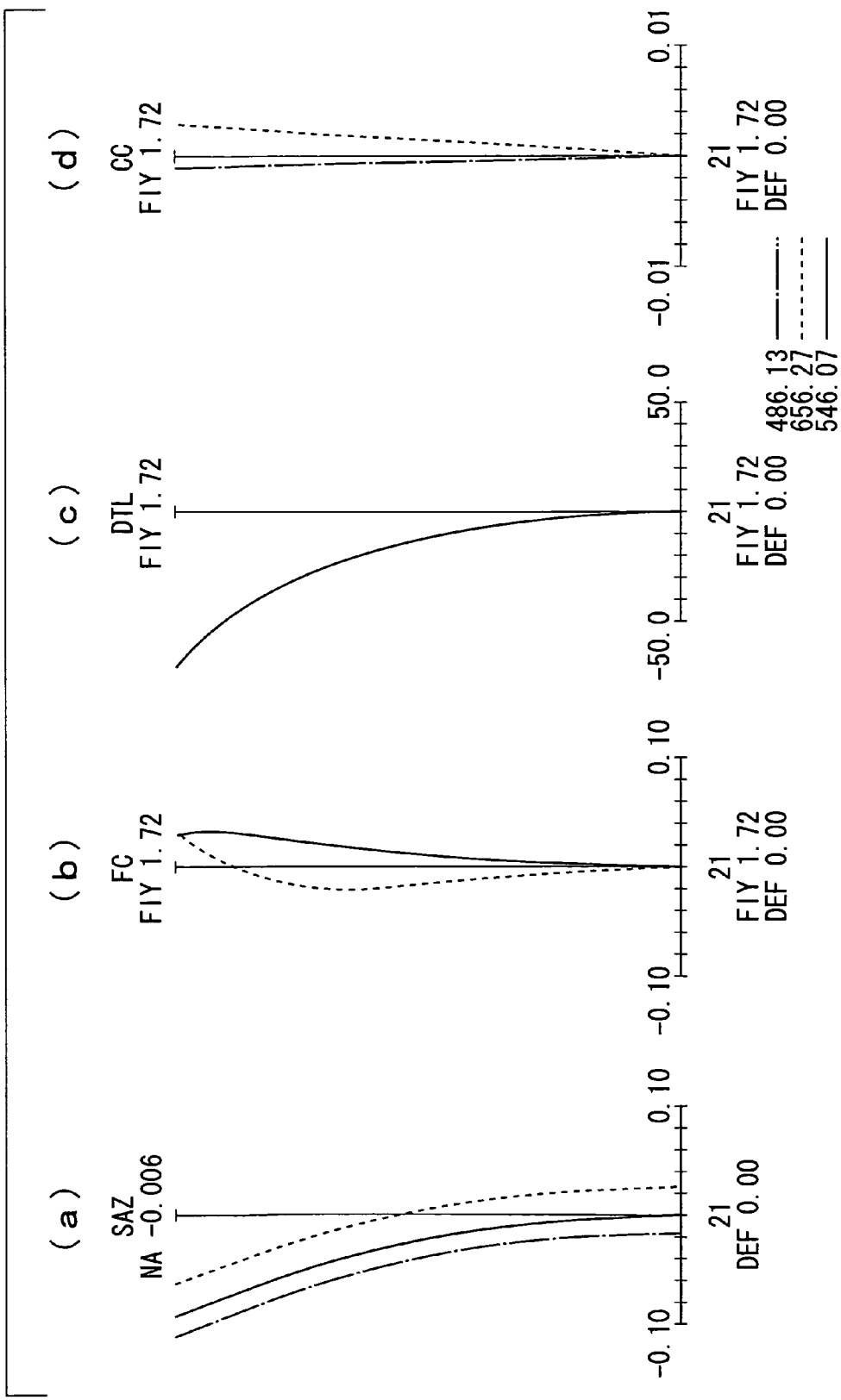
FIG. 13 shows aberration diagrams showing the spherical aberration, astigmatism, distortion, and magnification chromatic aberration of the objective optical system in FIG. 11.
Figure 14:
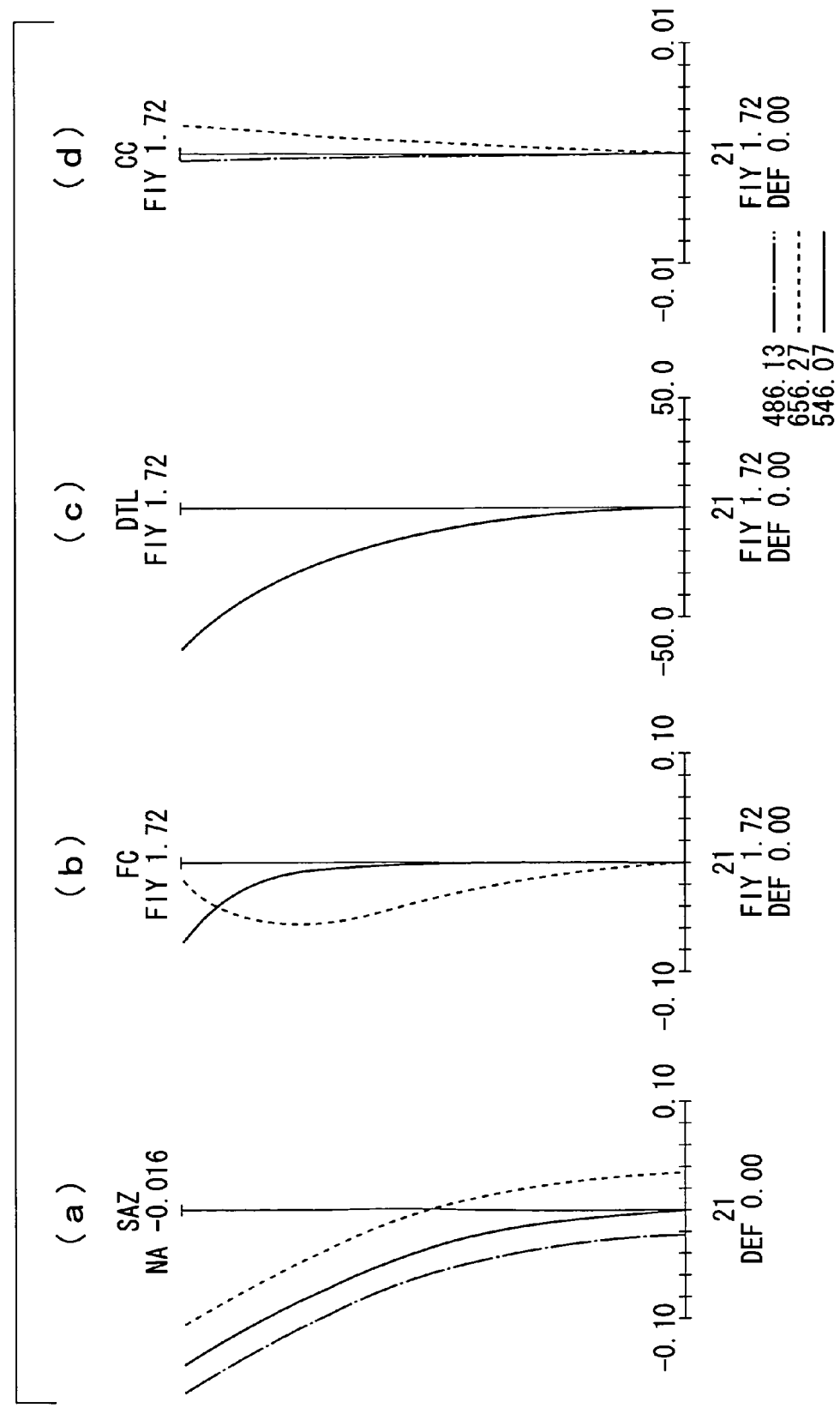
FIG. 14 shows aberration diagrams showing the spherical aberration, astigmatism, distortion, and magnification chromatic aberration of the objective optical system in FIG. 12.

The values of varying parameters of the thus-configured objective optical system in two states, that is, the ordinary observation state and the near observation state, are shown in Table 3, and aberration diagrams of the individual states are shown in FIGS. 13 and 14.

Lens Data

| Surface number | Radius of curvature | Distance between surfaces | Refractive index Ne | Abbe number vd |
|---|---|---|---|---|
| 1 | ∞ | 0.38 | 1.88815 | 40.76 |
| 2 | 1.217 | 0.68 | | |
| 3 | −10.344 | 0.67 | 1.88815 | 40.76 |
| 4 | −18.708 | D4 | | |
| 5 | 1.465 | 0.49 | 1.59143 | 61.14 |
| 6 | 1.748 | D6 | | |
| 7 | Aperture stop | 0.20 | | |
| 8 | 4.217 | 1.11 | 1.77621 | 49.60 |
| 9 | −4.217 | 0.62 | | |
| 10 | ∞ | 0.31 | 1.51564 | 75.00 |
| 11 | ∞ | 0.62 | | |
| 12 | 4.197 | 1.58 | 1.48915 | 70.23 |
| 13 | −1.902 | 0.40 | 1.93430 | 18.90 |
| 14 | −4.776 | 1.22 | | |
| 15 | ∞ | 0.40 | 1.52498 | 59.89 |
| 16 | ∞ | 0.30 | | |
| 17 | ∞ | 0.40 | 1.51825 | 64.14 |
| 18 | ∞ | 1.00 | 1.50801 | 60.00 |
| 19 | Imaging plane | | | |

TABLE 3

| Parameter | Ordinary Observation State | Near Observation State |
|---|---|---|
| Focal length | 1.7 | 1.63 |
| Fno | 7.93 | 7.94 |
| Object point distance | 18.7 | 5.66 |
| D4 | 0.34 | 0.78 |
| D6 | 0.92 | 0.48 |
| Image height IH | 1.72 mm | |

Table 4 shows the values of Conditional Expressions (1) to (11) in the objective optical system according to Examples 1 to 3.

TABLE 4

| Conditional Expression | Example 1 | Example 2 | Example 3 |
|---|---|---|---|
| (1) | 0.08 | 0.01 | 0.06 |
| (2) | 1.00 | 0.97 | 0.99 |
| (3) | 0.20 | 0.14 | 0.20 |
| (4) | −0.78 | −0.89 | −0.81 |
| (5) | 6.48 | 8.00 | 5.48 |
| (6) | 2.13 | 1.92 | 1.70 |
| (7) | 0.71 | 0.71 | 0.80 |
| (8) | 1.13 | 1.11 | 1.11 |
| (9) | 6.86 | 7.03 | 6.82 |
| (10) | 0.99 | 0.94 | 0.98 |
| (11) | 72.2 | 81.3 | 73.8 |

{Notes}

Inventions with the following configurations are derived from the examples.

{Note 1}

An objective optical system comprising, in order from an object side, a first group, a second group, and a third group, wherein the first group includes, in order from the object side, a plano-concave lens and a meniscus lens whose convex surface is towards an image side; and the second group has positive power and moves in the direction of an optical axis to perform focusing.

{Note 2}

The objective optical system according to Note 1, wherein the first group has negative power, and the third group has positive power.

{Note 3}

The objective optical system according to Note 1, wherein the second group includes a positive meniscus lens whose convex surface is towards the object side, and the third group includes a first positive lens and a joined lens composed of a second positive lens and a negative lens.

{Note 4}

The objective optical system according to Note 1, wherein the following Conditional Expressions (1) and (2) are satisfied:

$$|f/f2|<0.12 \tag{1}$$

$$0.92<f/\text{IH}<1.08 \tag{2}$$

where f is the focal length of the entire system during far-point observation, f2 is the focal length of the meniscus lens, and IH is an image height.

{Note 5}

An objective optical system comprising, in order from an object side, a plano-concave lens, a meniscus lens whose convex surface is towards an image side, an aperture stop, a first positive lens having convex surfaces at both sides, and a joined lens composed of a second positive lens and a negative lens, and satisfying the following Conditional Expression (3):

$$0.08<d/f<0.32 \tag{3}$$

where d is the air gap between the meniscus lens and the first positive lens.

{Note 6}

The objective optical system according to Note 1, where the meniscus lens of the first group is a positive or negative lens having low power.

{Note 7}

The objective optical system according to any of Notes 1 to 5, wherein the following Conditional Expression (4) is satisfied:

$$-0.94<f1/f<-0.72 \tag{4}$$

where f1 is the focal length of the plano-concave lens.

{Note 8}

The objective optical system according to any of Notes 1 to 5, wherein the following Conditional Expression (5) is satisfied:

$$5.1 < f3/f < 8.4 \quad (5)$$

where f3 is the focal length of the third lens.

{Note 9}

The objective optical system according to Note 3 or 5, wherein the following Conditional Expression (6) is satisfied:

$$1.2 < f4/f < 2.6 \quad (6)$$

where f4 is the focal length of the first positive lens.

{Note 10}

The objective optical system according to any of Notes 3 to 5, wherein the following Conditional Expression (7) is satisfied:

$$0.55 < |f5/f6| < 0.94 \quad (7)$$

where f5 is the focal length of the second positive lens, and f6 is the focal length of the negative lens.

{Note 11}

The objective optical system according to Note 3 or 5, wherein the following Conditional Expression (8) is satisfied:

$$0.95 < |r/f| < 1.3 \quad (8)$$

where r is the radius of curvature of the joining surface of the second positive lens and the negative lens.

{Note 12}

The objective optical system according to any of Notes 1 to 5, wherein the following Conditional Expression (9) is satisfied:

$$6 < LTL/f < 8 \quad (9)$$

where LTL is the total length of the lens system.

{Note 13}

The objective optical system according to any of Notes 1 to 5, wherein the following Conditional Expression (10) is satisfied:

$$0.8 < \omega n/\omega f < 1.2 \quad (10)$$

where ωf is the maximum half angle of view during far observation, and ωn is the maximum half angle of view during near observation.

{Note 14}

The objective optical system according to any of Notes 1 to 5, wherein the following Conditional Expression (11) is satisfied:

$$\omega f > 60 \quad (11)$$

{REFERENCE SIGNS LIST}

| | |
|---|---|
| 1 | objective optical system |
| 2 | chip-sealing glass |
| 3 | optical element |
| F1, F2 | parallel flat plate |
| G1 | first group |
| G2 | second group |
| G3 | third group |
| L1 | first lens (piano-concave lens) |
| L2 | second lens (meniscus lens) |
| L3 | third lens (positive meniscus lens) |
| L4 | fourth lens (first positive lens) |
| L5 | positive lens (second positive lens) |
| L6 | negative lens (negative lens) |
| L56 | fifth lens (joined lens) |
| S | aperture stop |

The invention claimed is:

1. An objective optical system comprising, in order from an object side, a first group, a second group, and a third group, wherein
   the first group includes, in order from the object side, a plano-concave lens and a meniscus lens whose convex surface is towards an image side;
   the second group includes a positive meniscus lens whose convex surface is towards the object side and moves in a direction of an optical axis to perform focusing;
   the first group has negative power; and
   the third group has positive power.

2. The objective optical system according to claim 1, wherein
   the third group includes a first positive lens and a joined lens composed of a second positive lens and a negative lens.

3. The objective optical system according to claim 1, wherein
   an aperture stop is disposed between the second group and the third group, and
   the third group includes, in order from the object side, a first positive lens having convex surfaces at both sides, and a joined lens composed of a second positive lens and a negative lens, and satisfying the following Conditional Expression (3):

$$0.08 < d/f < 0.32 \quad (3)$$

where
   d: the air gap between the meniscus lens whose convex surface is towards the image side and the positive meniscus lens whose convex surface is towards the object side,
   f: a focal length of an entire system during far-point observation.

4. An objective optical system comprising, in order from an object side, a first group, a second group, and a third group, wherein
   the first group includes, in order from the object side, a plano-concave lens and a meniscus lens whose convex surface is towards an image side;
   the second group includes a positive meniscus lens whose convex surface is towards the object side and moves in a direction of an optical axis to perform focusing; and
   the following Conditional Expressions (1) and (2) are satisfied:

$$|f/f2| < 0.12 \quad (1)$$

$$0.92 < f/\text{IH} < 1.08 \quad (2)$$

where
   f: a focal length of an entire system during far-point observation,
   f2: a focal length of a meniscus lens whose convex surface is towards the image height,
   IH: image height.

5. The objective optical system according to claim 4, wherein
   the third group includes a first positive lens and a joined lens composed of a second positive lens and a negative lens.

6. The objective optical system according to claim 4, wherein
- an aperture stop is disposed between the second group and the third group, and
- the third group includes, in order from the object side, a first positive lens having convex surface at both sides, and a joined lens composed of a second positive lens and a negative lens, and satisfying the following Conditional Expression (3):

$$0.08 < d/f < 0.32 \qquad (3)$$

where
- d: the air gap between the meniscus lens whose convex surface is towards the image side and the positive meniscus lens whose convex surface is towards the object side.

* * * * *